UNITED STATES PATENT OFFICE.

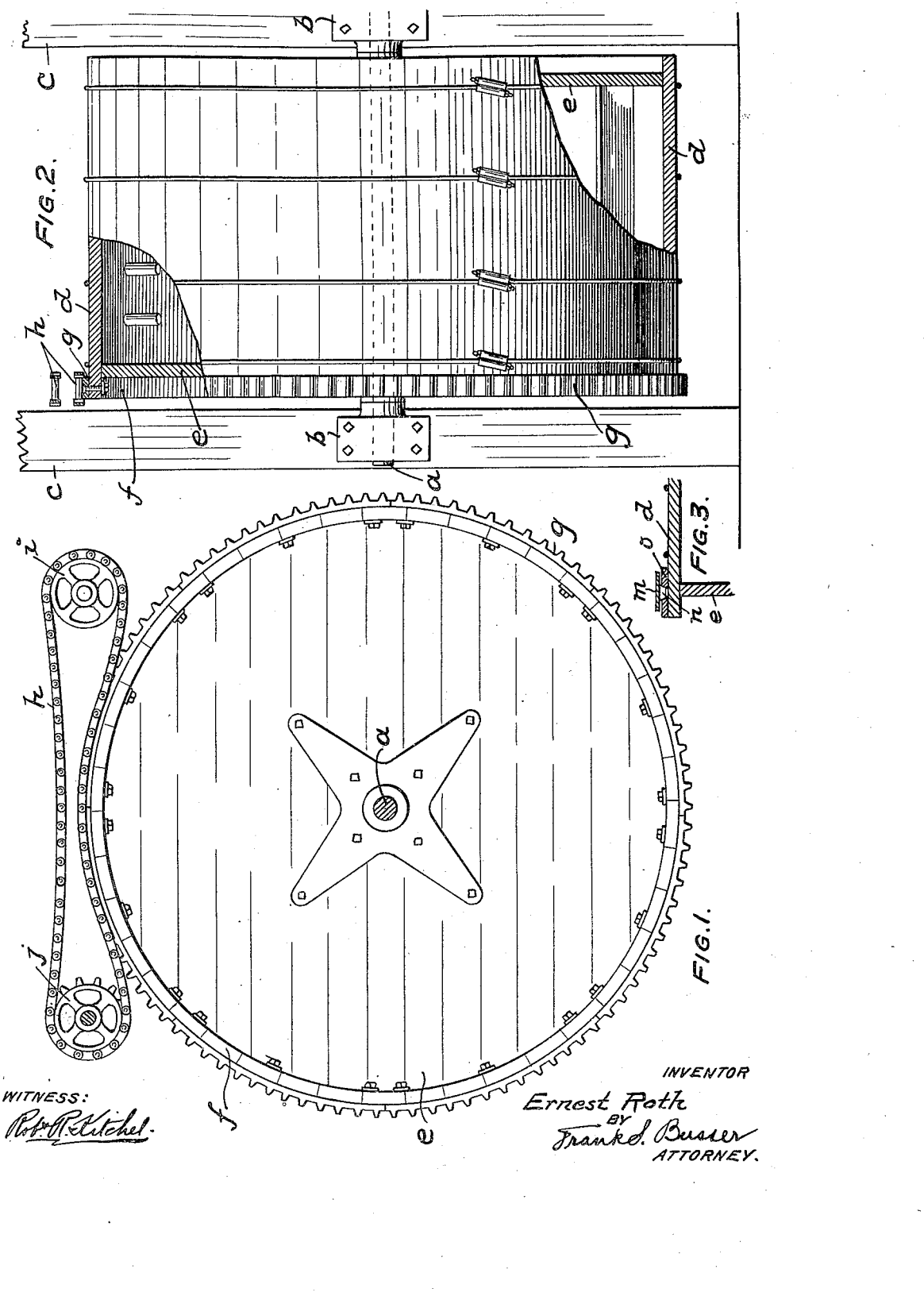

ERNEST ROTH, OF PHILADELPHIA, PENNSYLVANIA.

DRIVING MEANS FOR TANNING DRUMS.

1,423,028.  Specification of Letters Patent.  Patented July 18, 1922.

Application filed July 13, 1918. Serial No. 244,726.

*To all whom it may concern:*

Be it known that I, ERNEST ROTH, a citizen of the United States, residing at Philadelphia, county of Philadelphia, and State of Pennsylvania, have invented a new and useful Improvement in Driving Means for Tanning Drums, of which the following is a full, clear, and exact description, reference being had to the accompanying drawings, which form a part of this specification.

In tanneries, rotating drums are used in a variety of operations, such as softening, tanning, pickling, coloring and washing. These drums turn on horizontal axes and are from three to six feet in length and from five to ten feet in diameter. The drums are practically tumbling barrels. Those used for softening are provided with pins on the inner walls. Shelves are attached to the interior of the drums employed for the coloring operation. For whatever purpose they are used, and whatever their internal construction, they are all, with their contents, so ponderous that it is impracticable to drive them by power applied direct to the shaft of the drum, so that it is necessary to devise other driving means which will impose no severe strain on the driving mechanism or the bearings of the drum shaft. Leather belt drives have been found unsuitable because of slippage, although they are in use.

The most generally used, and heretofore the most nearly satisfactory, drive comprises a circular rack applied to the peripheral wall of the drum and a driving gear wheel directly engaged therewith. When the structure is new, the drive is smooth and effective, but in use the drum inevitably swells somewhat and gets more or less out of shape, thus destroying the fine alinement required in a gear drive. Hence, the gear and rack do not properly mesh, the mechanism becomes exceedingly noisy, the teeth wear away, and much power is wasted by excessive friction. Moreover, at any given time, the entire driving stress is borne by only two of the teeth of a rack having a length from about sixteen to thirty-two feet.

My invention provides a drive which has sufficient leverage for the proper operation of the heaviest drum, imposes a minimum of strain upon the driving mechanism, maintains proper engagement between driving and driven members, is not subject to slippage, is practically noiseless, is subject to no excessive friction, and automatically adjusts itself to any disturbance of alinement or change of shape arising from swelling of the body of the drum.

A preferred embodiment of the invention is shown in the drawings, wherein Fig. 1 is an end view, and Fig. 2, a side view, of the drum and its driving mechanism; while Fig. 3 is a fragmentary sectional view showing a modification.

The shaft $a$ of the drum turns in bearings $b$ in a suitable frame $c$. The peripheral wall $d$ of the drum projects beyond one end wall $e$, forming an annular or peripheral flange $f$, to which is secured a sprocket wheel $g$ which is driven by a sprocket chain $h$, in the peculiar manner shown at the top of Fig. 1. The sprocket wheel $g$ is substantially a rack, composed of a number of toothed sections bolted to the flange $f$.

This sprocket chain $h$ extends around wheels $i$ and $j$, one of which is a sprocket wheel driven by suitable power and the other of which is an idler having, preferably, an untoothed periphery. The drum sprocket is driven by engagement with the outside of the sprocket chain. The wheels $i$ and $j$ are so positioned that an imaginary line tangential to both their peripheries, and corresponding roughly with the path of that reach of the chain which engages the drum sprocket, forms a chord of the circle corresponding to the periphery of the drum. Hence, the lower reach of the chain may be arranged to engage, throughout any desired part of its length, with a correspondingly long part of the circumference of the drum sprocket. As shown in the drawings, I prefer to so position the wheels $i$ and $j$ that the lower reach of the chain $h$ will be in driving engagement, throughout the greater part of its length, with the drum sprocket.

It will be clear, from the foregoing, that the driving strain is distributed, at any given time, over a large number of teeth on the drum; and that any disturbance of exact alinement, or any change in the shape of the drum due to swelling, or any sagging of the drum due to the weight of the materials contained therein, will not appreciably disturb the proper driving engagement between the driving chain and the drum sprocket. The drive is practically noiseless, the loss by friction is slight, and the driving chain automatically adapts itself to such warping, or disturbance in position, of the drum as is likely to occur. This automatic adaptation is rendered more certain by providing the idler wheel with a plain periphery.

Instead of a sprocket chain $h$ I may employ a belt $m$ having on its outer face wedge-shaped lugs $n$ adapted to frictionally engage a circumferential groove in a wheel $o$ secured to the periphery of the drum, as shown in Fig. 3.

Having now fully described my invention, what I claim and desire to protect by Letters Patent is:

Driving means for tanners' drums or heavily loaded drums of large diameter, comprising a shaft for the drum, bearings for said shaft, a driving shaft parallel with and above the drum shaft and at one side of a vertical plane passing through the axis of the drum shaft, a driving sprocket wheel on the driving shaft and of very small diameter relatively to the diameter of the drum, an idle sprocket wheel arranged to rotate about an axis parallel to the driving shaft spaced from, and in substantially the same horizontal planes as the driving sprocket wheel, said idle wheel being at the side of the vertical plane passing through the axis of the drum shaft opposite the driving shaft, said sprocket wheels being between two vertical planes extending through the drum, a sprocket rack on the periphery of the drum extending into the space between the sprocket wheels, above the lower plane and below the upper of said horizontal planes, and a slack sprocket chain extending around the sprocket wheels and in engagement with the sprocket rack, the sprocket wheels and the rack being so disposed with relation to each other that the upper reach thereof extends in substantially a horizontal plane, while the major portion of the lower reach is of arcuate form within the planes of the sprocket wheels, the sprocket wheels being so spaced and positioned that the major portion of the lower reach of the chain is in contact with the rack and engaging a relatively large number of teeth of the rack, and is held in contact by gravity alone.

In testimony of which invention, I have hereunto set my hand, at Philadelphia, Pa., on this 25th day of June, 1918.

ERNEST ROTH.